July 27, 1965 B. B. BERGEVIN 3,196,835
ANIMAL WATER AND FEED MIXING AND DISPENSING DEVICE
Filed Sept. 11, 1963 2 Sheets-Sheet 1
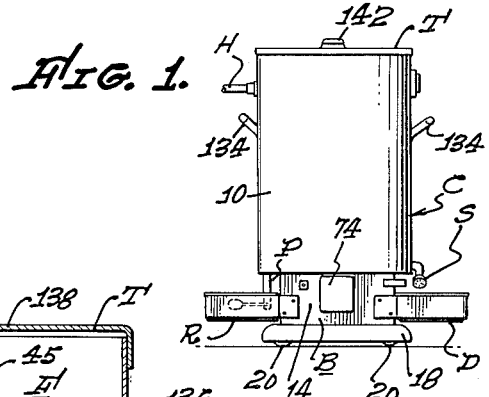
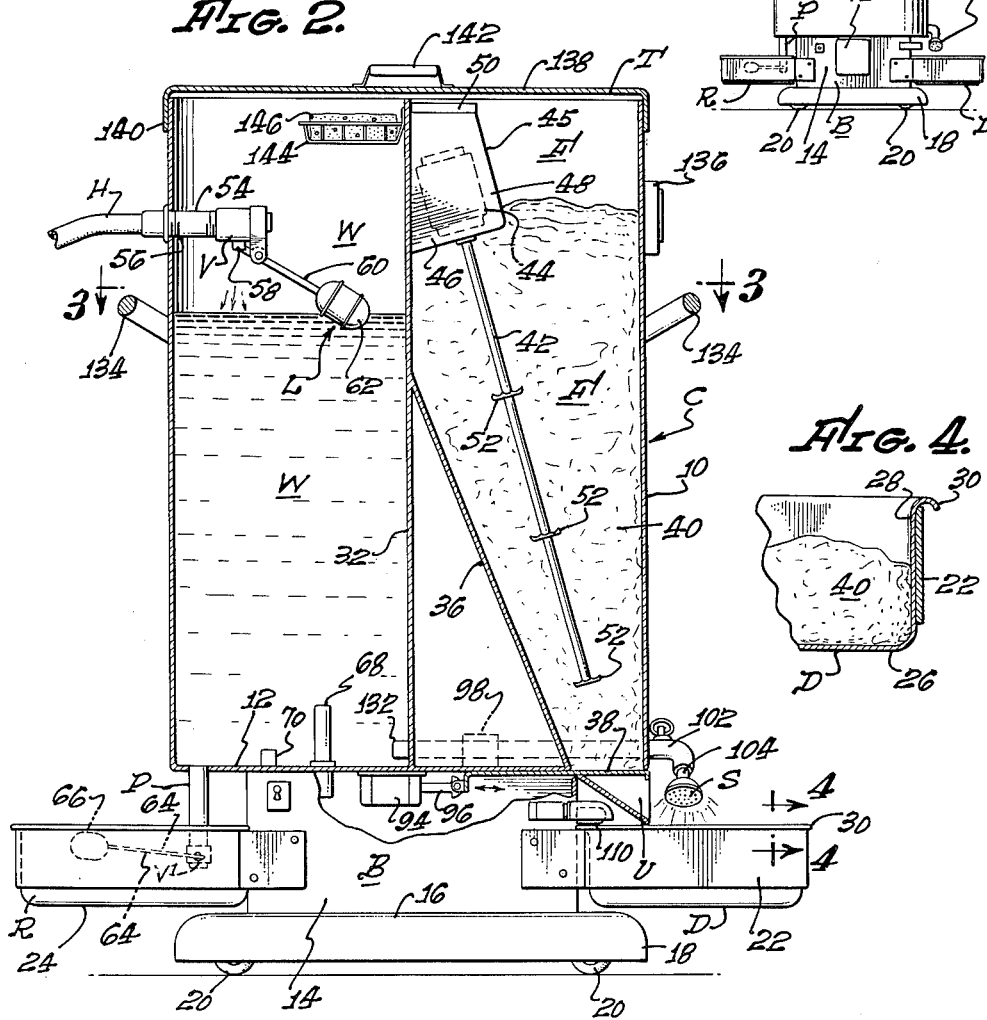
BERNIE B. BERGEVIN,
INVENTOR.
BY
William C. Babcock
ATTORNEY.

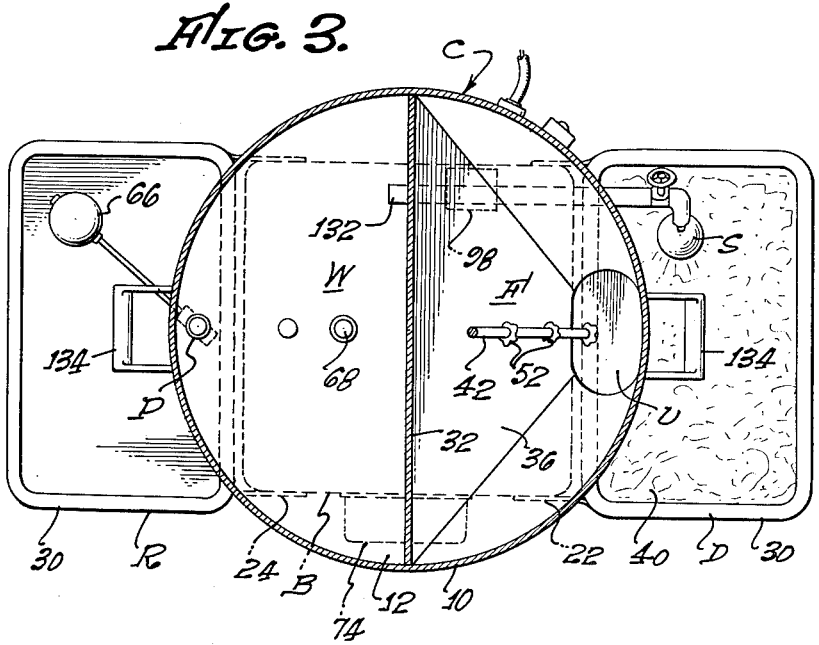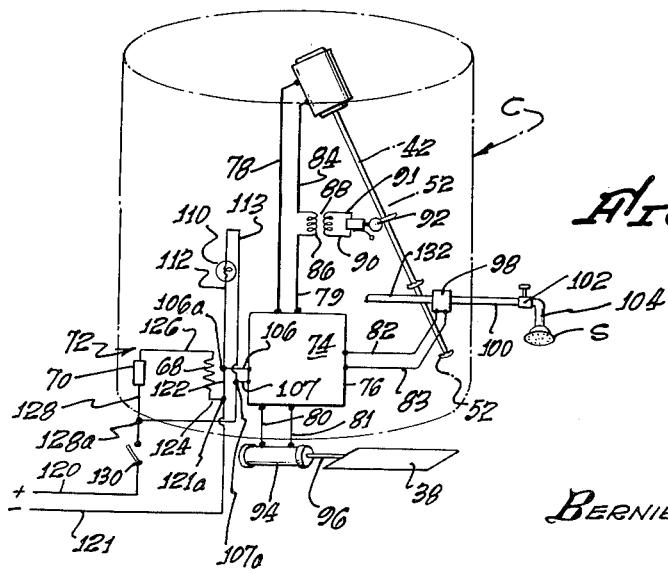

United States Patent Office 3,196,835
Patented July 27, 1965

3,196,835
ANIMAL WATER AND FEED MIXING AND
DISPENSING DEVICE
Bernie B. Bergevin, 2626 Palos Verdes Drive N.,
Rolling Hills, Calif.
Filed Sept. 11, 1963, Ser. No. 309,590
6 Claims. (Cl. 119—51.11)

The present invention relates to the field of food and liquid dispensing devices, and more particularly to an apparatus that dispenses predetermined quantities of food at timed intervals for the feeding of animals, as well as providing a constant source of clean drinking water.

As is well known to pet owners, one of the inconveniences of keeping such animals is the problem of supplying them with food at regular intervals over week-end periods, or at such time as the owner may be away from home. The only solution to this problem at the present time is to place pets in the care of a veterinarian or with friends. However, this expedient it not satisfactory in all instances, for the pets are exposed to a strange environment, and oftentimes are subjected to food and water having different characteristics than that to which they are accustomed.

A major object of the present invention is to provide a device that is adapted to dispense pet food in predetermined quantities at timed intervals into a bowl or trough from which the animal can feed, and at all times provide the animal with an adequate supply of fresh, clean water, which water in colder climates is artificially heated to prevent freezing thereof.

Another object of the invention is to supply an animal feeding device that can be moved from place to place, is compact, attractive in appearance, and is so designed that it can be fabricated from standard, commercially available materials.

A still further object of the invention is to furnish an animal feeding device in which both the water and food are maintained in covered containers, and one which supplies the food and water to the animal in a sanitary condition.

Another object of the invention is to provide an aimal feeding device of relatively simple mechanical structure from which food can be dispensed in dry form, or mixed with water at the time it is discharged therefrom.

These and other objects and advantages of the present invention will become apparent from the following description thereof, and from the accompanying drawings, in which:

FIGURE 1 is a side elevational view of the animal feeding device of the present invention;

FIGURE 2 is a vertical cross-sectional view of the device;

FIGURE 3 is a horizontal cross-sectional view of the device, taken on the line 3—3 of FIGURE 2;

FIGURE 4 is a fragmentary vertical cross-sectional view of the feeding trough; and FIGURE 5 is a diagrammatic view of the electrical wiring diagram, and the elements actuated by completion of circuits therein.

With continuing reference to the drawings for the general arrangement of the invention, it will be seen to include a container C which is preferably cylindrical and subdivided into a first compartment F in which the animal food is stored, and a second compartment W that serves as a water reservoir. The container C can be fabricated from any standard, commercially available sheet material that is substantially impervious to weather conditions, and one that can be bent, molded or otherwise fabricated into the desired shape. The container C is mounted on a base B, and this base supports a trough in which water is automatically discharged as needed from the compartment W, as well as a bracket that supports a dish D. The dish D is adapted to receive food discharged therein from compartment F, which food is then moistened by a spray of water S, as shown in FIGURE 2.

Water is supplied to the second compartment W through a hose H. Discharge of water from hose H is controlled by a float-operated valve L disposed within the confines of the second compartment W. A cover T is provided which has a downwardly extending flange formed on the circumferential edge thereof that slidably engages the upper portion of the container C and prevents entry of foreign material into the first and second compartments F and W, respectively. Food is discharged from the first compartment F into dish D through a suitable chute U (FIGURE 2), and water is also discharged into this dish from compartment W through a downwardly extending pipe P, on the lower end of which a float operative valve is mounted.

In detailed structure, the container C is preferably fabricated from a cylindrical wall 10 of sheet material that is preferably as light in weight as possible to permit easy shifting of the device from place to place, and to permit it to be transported as a whole unit from one location to another. Although numerous sheet materials have been found suitable for this purpose, resin impregnated Fiberglas, or one of the synthetic organic materials is preferred, for they are not adversely affected by the outdoor elements, either as to color or actual physical properties.

An annular piece of sheet material is provided that is bonded, or otherwise affixed to the lower circumferential edge of the cylindrical wall 10 to form the bottom 12 of container C. Container C is mounted on the upper edge portion of a cylindrical shell 14 which is considerably smaller in diameter than the container, as shown in FIGURES 1 and 2. An annular plate 16 is affixed to the lower edge portion of shell 14. A circumferentially extending flange 18 is formed on plate 16 that depends therefrom a sufficient distance to screen the major portion of a plurality of rollers 20 which are rotatably affixed to the plate by conventional means.

Two oppositely disposed brackets 22 and 24 are affixed to the exterior surface of the shell 14 by screws, tack-welding, or the like. Brackets 22 and 24 are preferably fabricated from strip steel in the form of closed loops to define enclosed spaces in which the dish D and water receptacle R may be seated. In FIGURE 2 it will be seen that the bracket 22 so supports the dish D that food is discharged therein from the chute U. Likewise, the bracket 24 so supports the water receptacle R that a pipe P extends downwardly therein, and a float operative valve attached to the lower end thereof is situated within the confines of the receptacle.

If desired, the dish D and receptacle R can be identical in construction, and preferably rectangular, as illustrated in FIGURE 3. Both the water receptacle R and dish D are preferably formed of sheet metal, but may be molded or otherwise formed of one of the synthetic plastic materials. The receptacle R and dish D each include a flat, rectangular bottom 26 from which continuous side walls 28 extend upwardly to terminate in a continuous, outwardly extending flange 30, the details of which may best be seen in FIGURE 4.

The container C is divided into the food compartment F and water compartment W by a vertical wall 32, the side edges of which are affixed to the cylindrical wall 10. The lower edge of the wall is sealed to the upper surface of the bottom 12 by conventional means to effect a fluid-tight seal therewith.

The food normally fed to animal pets such as dogs and cats is commercially available in the form of pellets, biscuits, or in the granular state, and in some instances, contain a sufficient quantity of edible oil that it tends to cling to the interior surface of the container in which they are disposed. To avoid this contingency in compartment F, a second sheet metal member 36 is provided that extends downwardly and outwardly from the wall 32 (FIGURE 2) to a position just inwardly from the opening into the chute U.

In FIGURES 2 and 5 it will be noted that the entrance to the chute U is normally blocked by a rectangular piece of rigid sheet material which serves as a gate 38. The food 40 in compartment F is agitated at the time it is desired to discharge it into the chute U by an elongate shaft 42 that is rotatably and eccentrically mounted in a downwardly extending position on an electric motor 44. Motor 44 in turn is supported on a rigid plate 46 that is an integral part of an enclosure 45 that is defined by a part of the upper portion of wall 32 and side walls 48 which are affixed not only to wall 32, but the plate 46 as well. Access to the interior of the enclosure 45 is effected through the upper portion thereof that is normally closed by a cap 50 of conventional design that is removably mounted on the upper edges of side walls 48. The enclosure 45 serves to protect the motor 44 against dust created during agitation of the food 40, as well as flying particles caused thereby. In FIGURE 2 it will be noted that a number of transversely disposed longitudinally spaced pins or lugs 52 are affixed to the shaft 42 which tend to further agitate the food 40 as the shaft is rotated.

The hose H which supplies water to the invention can be either removably or permanently affixed to the outwardly disposed end of a pipe nipple 54. Nipple 54 projects through an opening 56 formed in the upper portion of the cylindrical wall 10 which is in communication with the interior of the water compartment W. A float-operated valve V of a standard, commercially available design is mounted on the interior end portion of nipple 54, and has a discharge orifice 58 through which water is discharged at a gradually increasing rate as a lever 60 pivotally connected to a valve member (not shown) moves downwardly due to the action of a float 62. Float 62 at all times rests on the surface of the water in compartment W. When sufficient water has been discharged into compartment W to raise float 62 to a predetermined position, the lever 60 causes the valve member (not shown) to assume a fully obstructive position relative to orifice 58 where it remains until such time as the float permits the lever to pivot downwardly below a predetermined position.

As previously mentioned, discharge of water from the compartment W is effected through the pipe P, on the lower end of which a second float-operated valve V¹ is provided. Second valve V¹ permits water to be discharged therefrom when a lever 64 projecting therefrom pivots downwardly sufficiently, due to the action of a float 66 attached thereto, that the lever is below a predetermined position. Thus, when the level of water in receptacle R drops below a predetermined level, the second valve V¹ opens to permit discharge of further water into the receptacle until it has reached a predetermined level therein. At the same time, the concurrent lowering of water in the second compartment W causes the valve V to open and permit additional water to be discharged into this compartment until the water raises the lever 60 to a predetermined position.

In some localities, the invention may be situated outside a heated area whereby the water in compartment W will freeze during cold weather unless auxiliary heat is supplied to maintain it in the fluid state. To that end, an electrically actuated cartridge type heater 68 is provided, and mounted in an upwardly extending position in the lower portion of compartment W. It will be apparent that if the electrical heater 68 were permitted to operate continuously, the water in compartment W would become heated to a degree far above that required. Accordingly, a thermostat 70 is employed, and positioned in compartment W where it is in contact with the water therein. The heater 68 and thermostat 70 are connected by an electrical circuit denoted generally by the numeral 72, as shown in FIGURE 5.

A timer 74 of a commericially available type is provided that includes a clock 76 as an integral part thereof. The movement of the hands of the clock 76 completes an electrical circuit at the various times for which the clock may be manually set. At any one of the particular times for which it is set, the timer 74 is adapted to complete an electrical circuit to three pairs of insulated electrical conductors; a first pair of electrical conductors 78, 79, a second pair of electrical conductors 80, 81, and a third pair of electrical conductors 82, 83. Conductor 78 extends from the timer 74 to one terminal of motor 44. The other terminal of motor 44 is connected by a conductor 84 to one terminal of the primary 86 of a transformer 88. The other terminal of the primary 86 is connected to the conductor 79, with the secondary of the transformer 88 having two conductors 90, 91 extending therefrom to an electrically operated bell 92.

The second conductors 80, 81 are connected to the terminals of a solenoid 94 that is provided with an armature 96 which can be moved horizontally to transfer the gate 38 from a closed to a non-obstructing position relative to the entrance to chute U. The third pair of conductors 82, 83 are connected to a normally closed electrically operated valve 98 that has a discharge conduit 100 extending therefrom, which on its outer end is in turn connected to a manually operable gate valve 102. A curved, downwardly extending pipe 104 which is in communication with the discharge of manual gate valve 102 has a water spray S affixed to the lower end thereof, as shown in FIGURES 3 and 5.

Electrical energy is supplied to the timer 74 through two electrical conductors 106 and 107, the outer ends of which terminate in junction points 106a and 107a respectively. A small glow lamp 110 of any desired color is provided which is located at a convenient position on the exterior surface of the cylindrical container C and connected to the junction points 106a and 107a by electrical conductors 112, 113.

Two electrical conductors 120 and 121 are supplied, which have a plug (not shown) affixed to the outer ends thereof that may be connected to a domestic source of electrical energy. Conductor 121 terminates at a junction point 121a from which a conductor 122 extends to junction point 106a. The junction point 121a is also connected by a conductor 124 to one terminal of the heater 68, with the other terminal of the heater being connected by a conductor 126 to one terminal of the thermostat 70. The other terminal of thermostat 70 is connected by a conductor 128 to a junction point 128a disposed in the conductor 120, located forwardly of a manually operable switch 130, by means of which the flow of current through the conductor 120 may be interrupted when desired. In FIGURE 5 it will be seen that water is constantly supplied to the electrically actuated valve 98 through a conduit 132 which extends to the lower portion of the water compartment W.

Operation of the invention is relatively simple, and for convenience in moving the feeding device from place to place, it is preferable that two oppositely disposed U-shaped handles 134 be mounted on the upper exterior surface of the wall 10, as shown in FIGURE 2. Also, as a matter of convenience in determining whether the water heating portion of the invention should be actuated, it is desirable to mount a thermometer 136 at a convenient location on the exterior of container C.

The top of the container C is removably closed by a lid 138 that is formed from a circular piece of sheet metal having a continuous, downwardly extending flange 140 formed on the outer circumferential edge thereof. The interior diameter of flange 140 is slightly larger than that of the exterior surface of container C whereby the lid 138 is removably held in position thereon. For ease in placing it on and removing it from the container C, a handle 142 of U-shaped configuration is mounted in the central portion of lid 138. To facilitate cleaning the feeding device, a tray 144 is rigidly affixed to the interior surface of the cylindrical wall 10 as shown in FIGURE 2, that it adapted to hold a sponge 146.

In initiating operation of the invention for the first time, the compartment F is filled with food 40 to substantially the height shown in FIGURE 2, and the compartment W is likewise filled with water to the level shown. Thereafter, the timer 74 is manually adjusted so that as the hands of the clock 76 rotate, electrical circuits to the three pairs of conductors 78, 79; 80, 81 and 82, 83 are completed at desired intervals, such as 6:00 a.m., noon and 6:00 p.m. However, if desired, but one or two animal feedings may be made each day, at the discretion of the owner or operator of the invention.

The conductors 120 and 121 are then connected to a source of domestic electrical energy, and thereafter the motor 44, valve 92, and the gate 38 will be actuated at the time the timer permits electrical energy to flow through the three pairs of electrical conductors. When the timer 74 effects completion of an electrical circuit to the first conductors 78, 79, the motor 44 starts to rotate, and due to the eccentric mounting of the shaft 42 thereon, the shaft is whipped about to agitate the food 40 stored in the compartment F.

Concurrently with rotation of the electric motor 44, the gate 38 is moved inwardly due to energization of the solenoid 94 to permit food 40 from the compartment F to move downwardly through the chute U into the confines of the dish D. During the time the food 40 is being discharged, an electrical circuit is concurrently completed through the third conductors 82, 83 to energize and open the normally closed valve 98, whereby water from the spray head S and the food are concurrently discharged into the dish D. Water from the spray head S is necessary, if the food being fed the animal is of the hard, pelletized type that is quite popular in the present day feeding of animals such as dogs, cats, and the like. At the same time the motor 44 is energized, an electrical circuit is completed to the transformer 88, with the result that a bell or other audible electrically operated device is actuated at a particular time to signal a pet that food has been discharged into the dish D.

It will be particularly noted in FIGURE 5 that the small glow lamp 110 is so included as a part of the electrical circuit 72 that it is illuminated when the conductors 120, 121 are plugged into the source of domestic electrical energy. When the weather conditions are such that the water in the compartment W would freeze were it not heated, the switch 130 is placed in a closed position and the heater 68 is electrically energized when the temperature of the water falls below a predetermined temperature for which the thermostat 70 is set.

From the above description of the invention, it will be understood that the food 40 is automatically discharged from the first compartment F, and without the attention of the operator or owner thereof. The only attention the owner or operator thereof must give the feeding device to assure regular feeding of a pet, is that he must determine whether sufficient food 40 is maintained in the compartment F to last during the time interval he will be away from home. From experience it has been found that even with large dogs, a portable unit may be fabricated which will supply animals each day with food, and can continue to do so for as long as ten days at a time.

A particularly important feature of the invention is that food is not only discharged from the compartment F at the desired time, but in a predetermined quantity. In actual practice it has been found that food agitated by the whipping shaft 42 flows downwardly through chute U at a particular rate. Knowing this rate, it is a simple matter to compute the time interval the electrical circuit must remain energized to cause a certain quantity of food 40 to be delivered to dish D.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. A device for automatically dispensing particled animal food at predetermined time intervals and for maintaining a constant supply of drinking water, comprising:
   (a) an open-topped container;
   (b) means for supporting said container at an elevated position;
   (c) a vertically extending partition in which a dispensing opening is formed, which partition divides the interior of said container into first and second compartments, which hold said food, and said water respectively;
   (d) first and second dishes below said container for holding portions of said food and water respectively;
   (e) automatically controlled gate means which when in a first position obstruct said opening in the lower portion of said container through which said food can flow from said first compartment by gravity to said first dish;
   (f) first electrical means for moving said gate means from said first to a second position which permits discharge of said food from said first compartment to said first dish;
   (g) an agitator and second electrical means for agitating said food in said first compartment when said second means is electrically energized;
   (h) first float valve-controlled means for introducing water into said second compartment and maintaining the same at a fixed elevation therein;
   (i) second float valve-controlled means for discharging water by gravity from said second compartment into said second dish and maintaining the level of said water at a fixed elevation therein;
   (j) a conduit extending from said second compartment to said first dish;
   (k) a normally closed electrically operated valve in said conduit;
   (l) a clock-operated timer for periodically opening and closing an electric circuit; and
   (m) a plurality of electrical conductors connected to said first means, second means, normally closed electrically operated valve, with said timer being connected to a source of domestic electric power, with said timer when in a closed position completing a circuit through said conductors to energize said first means to move said gate means to a position where said food can flow by gravity from said first compartment to said first dish, which second means comprises an agitator for said food in said first compartment to facilitate the flow thereof therefrom, and means for opening said normally closed electrically operated valve to permit water to flow from said conduit into said first dish to mix with said food therein.

2. A device as defined in claim 1 which further includes a downwardly and outwardly projecting chute that extends from a position below said opening in said container through which said food can discharge to a second position above said first dish.

3. A device as defined in claim 1 which further includes at least one downwardly inclined rigid sheet that defines a part of said first compartment and serves to prevent compacting of said food therein to the extent that it will not flow by gravity from said opening when said food is agitated.

4. A device as defined in claim 1 wherein said second electrical means comprises an electric motor having a driving shaft positioned in the upper portion of said first compartment, which device further includes an elongate rigid member eccentrically mounted on said driving shaft that depends therefrom.

5. A device as defined in claim 1 which further includes:
 (a) a thermostat in said second compartment; and
 (b) an electric heater in said second compartment, which heater and thermostat are so connected to said conductors as to at all times receive electric energy from said domestic source, with said thermostat completing an electric circuit to said heater when the temperature of said water in said second compartment falls below a predetermined temperature.

6. A device as defined in claim 1 which further includes a lid that removably engages the upper open end of said container to close the same.

References Cited by the Examiner

UNITED STATES PATENTS

| | | | |
|---|---|---|---|
| 1,258,069 | 3/18 | Weyeneth et al. | 119—53.5 |
| 2,766,725 | 10/56 | Sievers | 119—51.5 |
| 2,782,760 | 2/57 | Wolfe | 119–51.5 |
| 2,829,871 | 4/58 | Vandenberg et al. | 259—10 |
| 2,929,356 | 3/60 | Bacigalupo | 119—51 |
| 3,037,481 | 6/62 | Kloss | 119—71 |

FOREIGN PATENTS 218,341  1/10  Germany.

SAMUEL KOREN, *Primary Examiner.*

ALDRICH F. MEDBERY, *Examiner.*